(12) United States Patent
Yakos et al.

(10) Patent No.: US 12,460,738 B2
(45) Date of Patent: Nov. 4, 2025

(54) MAGNETICALLY ACTUATED PIPE VALVE WITH TORQUE-LIMITING CLUTCH AND POSITION INDICATION

(71) Applicant: MagDrive Technologies, Inc., Bozeman, MT (US)

(72) Inventors: David Yakos, Bozeman, MT (US); Stephen Sanford, Bozeman, MT (US); Robert K. Burgess, Sheridan, WY (US)

(73) Assignee: MagDrive Technologies, Inc., Bozeman, MT (US)

( * ) Notice: Subject to any disclaimer, the term of this patent is extended or adjusted under 35 U.S.C. 154(b) by 0 days.

(21) Appl. No.: 18/885,048

(22) Filed: Sep. 13, 2024

(65) Prior Publication Data

US 2025/0003521 A1    Jan. 2, 2025

Related U.S. Application Data

(63) Continuation-in-part of application No. 18/646,183, filed on Apr. 25, 2024, now Pat. No. 12,117,094.

(60) Provisional application No. 63/463,181, filed on May 1, 2023.

(51) Int. Cl.
*F16K 31/08* (2006.01)

(52) U.S. Cl.
CPC .......... *F16K 31/088* (2013.01); *F16K 31/086* (2013.01)

(58) Field of Classification Search
CPC .... F16K 31/041; F16K 31/042; F16K 31/082; F16K 5/0647; F16K 31/043; F16K 31/088; F16K 31/086; F16K 37/033
See application file for complete search history.

(56) References Cited

U.S. PATENT DOCUMENTS 3,378,710 A     4/1968  Martin, Jr.
3,645,650 A  *  2/1972  Laing ..................... H02K 49/06
                                                         310/104
(Continued)

FOREIGN PATENT DOCUMENTS

CN       112600379 A  *  4/2021  ................ F04B 1/02
CN       215487686 U  *  1/2022

OTHER PUBLICATIONS

CN-112600379-A Translation (Year: 2021).*

*Primary Examiner* — Umashankar Venkatesan
(74) *Attorney, Agent, or Firm* — NEO IP

(57) ABSTRACT

A valve includes a magnetic actuation mechanism providing torque-limiting capabilities and valve stem position indication. A drive shaft of the valve is surrounded by a first annular magnetic array within a fully sealed pressure vessel. A second annular magnetic array is positioned outside of the pressure vessel and surrounds the fully sealed pressure vessel. Each of the first annular magnetic array and the second annular magnetic array include magnets having alternating polarity, allowing the first annular magnetic array and the second annular magnetic array to form a first order coupling mechanism. When the second, outside annular magnetic array is rotated, the first annular magnetic array is caused to move, actuating the valve. Importantly, the valve includes a position indication system able to determine a position of the valve stem and includes an automatic feedback mechanism for comparing an actual position of the valve with an expected position of the valve.

8 Claims, 11 Drawing Sheets

(56) References Cited

U.S. PATENT DOCUMENTS

| | | | |
|---|---|---|---|
| 7,368,838 B2* | 5/2008 | Binnard | H02K 41/0356 |
| | | | 310/15 |
| 7,758,013 B2 | 7/2010 | Arai et al. | |
| 8,358,044 B2 | 1/2013 | Waszak et al. | |
| 9,219,395 B2 | 12/2015 | Powell et al. | |
| 9,377,121 B2 | 6/2016 | Burgess et al. | |
| 9,444,318 B2 | 9/2016 | Atallah et al. | |
| 9,685,850 B2* | 6/2017 | Kozo | F16K 11/07 |
| 9,702,469 B2 | 7/2017 | Burgess et al. | |
| 9,876,407 B2 | 1/2018 | Walsh | |
| 9,908,603 B2 | 3/2018 | Claus et al. | |
| 10,221,959 B1 | 3/2019 | Davis | |
| 10,916,999 B2* | 2/2021 | Mostovoy | H02K 3/47 |
| 2015/0228417 A1* | 8/2015 | Maruyama | H02P 25/06 |
| | | | 335/187 |
| 2019/0123630 A1* | 4/2019 | Walsh | H02K 7/11 |
| 2021/0404575 A1* | 12/2021 | Young | F16K 31/041 |
| 2022/0166273 A1 | 5/2022 | Nam et al. | |

* cited by examiner

MAGNETICALLY ACTUATED PIPE VALVE WITH TORQUE-LIMITING CLUTCH AND POSITION INDICATION

CROSS REFERENCES TO RELATED APPLICATIONS

This application is a continuation-in-part of U.S. patent application Ser. No. 18/646,183, filed Apr. 25, 2024, which claims priority to and the benefit of U.S. Provisional Patent Application No. 63/463,181, filed May 1, 2023, each of which is incorporated herein by reference in its entirety.

BACKGROUND OF THE INVENTION

1. Field of the Invention

The present invention relates to magnetically actuated valve mechanisms, and more specifically to actuation via a torque-limiting first order magnetic coupling and including a position indication system to determine the actual position of a valve stem.

2. Description of the Prior Art

It is generally known in the prior art to provide magnetically actuated and electromagnetically actuated pipe valves.

Prior art patent documents include the following:

U.S. Pat. No. 9,876,407 for Halbach motor and generator by inventor Walsh, filed Feb. 20, 2014 and issued Jan. 23, 2018, discloses a motor including two magnetically coupled, coaxially-nested Halbach cylinder rotors, one of which passes through a toroidal series of at least two stator coils while the other is attached to an axle or other means of transferring mechanical power. An embodiment is described comprising an additional third Halbach cylinder rotor in which a circumferential arrangement of permanent magnets is mounted rotatably and proximally outside the stator coils, coaxial with the stator coils. Adjacent stator coils are configured so as to produce opposing magnetic fields upon energizing of the motor. Alternating the current to the stator coils induces movement in the rotor. Commutation can occur brushlessly, or the motor can be configured to function without commutation by varying the frequency of the alternating current, and can be configured to operate by either DC or AC current. Alternatively, the rotor may be driven to generate an electric current in the stator.

US Patent Pub. No. 2022/0166273 for 2-segment quasi-halbach rotor of motor by inventors Nam et al., filed Nov. 22, 2021 and published May 26, 2022, discloses a rotor of motor, and more particularly, a 2-segment quasi-Halbach rotor of motor that includes a radial magnet and a circumferential magnet which are Halbach-arrayed and a back iron providing a flux to reduce a thickness of the magnet and acquire high air-gap flux density.

U.S. Pat. No. 8,358,044 for Electric machine apparatus with integrated, high torque density magnetic gearing by inventors Waszak et al., filed Feb. 14, 2006 and issued Jan. 22, 2013, discloses an electrical machine apparatus having magnetic gearing embedded therein including a moveable rotor having a first magnetic field associated therewith, a stator configured with a plurality of stationary stator windings therein, and a magnetic flux modulator interposed between the moveable rotor and the stator windings. The magnetic flux modulator is configured to transmit torque between the first magnetic field associated with said moveable rotor and a second magnetic field excited by the plurality of stationary stator windings.

U.S. Pat. No. 9,908,603 for Magnetically geared electric drive by inventors Claus et al., filed Feb. 6, 2015 and issued Mar. 6, 2018, discloses an encapsulated magnetically geared brushless electric marine propulsion system with the principle components arranged axially around the central shaft. The marine propulsion system includes: the brushless DC motor, comprised of the stator fixed to the central shaft and motor magnets fixed within the motor rotor coupled to the central shaft using precision ball bearings; the high-speed magnetic gear rotor coupled to the motor rotor comprising an alternating array of magnets fixed to a ferromagnetic backing; the environmental barrier which protects the motor and additionally houses pole pieces to modulate magnetic flux; the low-speed magnetic gear rotor coupled to the central shaft and comprised of an alternating array of magnets fixed to a ferromagnetic backing; the propeller coupled to the low-speed magnetic gear rotor; and the shroud coupled to the struts of the motor mounting system.

U.S. Pat. No. 9,377,121 for Leak-free rotary valve with internal worm gear by inventors Burgess et al., filed Nov. 18, 2012 and issued Jun. 28, 2016, discloses a rotary valve assembly comprising a leak-free enclosure containing a worm gear and a pinion gear, an adapter plate that is situated between a rotary valve body and the enclosure and that secures the rotary valve body to the enclosure, and a magnetic actuator assembly. The worm gear engages with the pinion gear such that when the worm gear rotates, the pinion gear rotates as well. The enclosure is situated between the magnetic actuator assembly and the rotary valve body. A shaft extends through the center of the pinion gear and causes a valve within the rotary valve body to open and close based on rotation of the shaft. In an alternate embodiment, the invention is a rotary valve as described above with an integral adapter plate.

U.S. Pat. No. 10,221,959 for Higher speed lower torque magnetic valve actuator by inventor Davis, filed Oct. 3, 2018 and issued Mar. 5, 2019, discloses various devices and techniques related to magnetically-actuated valves. In some examples, magnetically-actuated valves may include mechanisms to provide mechanical advantage such that the torques or forces applied to the valve member are higher than the torques or forces transmitted across the sealed valve enclosure by the magnetic coupling. In some examples, valves may employ mechanisms coupled to the external actuator with inverse mechanical advantage that better match traditional or convenient actuation rates of other valves.

U.S. Pat. No. 9,702,469 for Leak-free rising stem valve with ball screw actuator by inventors Burgess et al., filed Nov. 11, 2015 and issued Jul. 11, 2017, discloses a rising stem valve with a magnetic actuator having an outer and as inner magnet assembly that are magnetically coupled to each other so that the inner and outer magnet assemblies rotate together and a ball screw that is connected to the rising stem valve and that converts rotary to reciprocal motion. The inner magnetic cartridge assembly and valve body comprise a sealed lower section that is completely sealed to the outside environment.

U.S. Pat. No. 7,758,013 for Motor-operated valve by inventors Arai et al., filed Sep. 6, 2007 and issued Jul. 20, 2010, discloses a motor-operated valve including a driving unit including a rotor and a stator, a feed screw mechanism, and a valve main body unit. In order to remove backlash intrinsic in the feed screw mechanism, a coil spring that urges a valve body in a direction away from a valve seat is arranged in a valve chamber. A spring bearing that forms a housing, in which the coil spring is housed, in the valve chamber is provided. Therefore, the large valve chamber is secured in the valve main body unit and passing sound is reduced when a fluid passes the motor-operated valve. Contact surfaces of the valve body and the coil spring can be aligning curved surfaces that absorb a bend of the coil spring.

U.S. Pat. No. 9,444,318 for Magnetic gear with first and second members arranged to interact in a magnetically geared manner by inventors Atallah et al., filed Apr. 29, 2014 and issued Sep. 13, 2016, discloses magnetic gears comprising first and second moveable members arranged to interact in a magnetically geared manner via a first electrical winding arrangement arranged to generate, at least in part, a first magnetic flux having a first number of pole-pairs, and one or more pole-pieces arranged to modulate the first magnetic flux to interact with a second magnetic flux having a second number of pole-pairs, wherein the first number of pole-pairs is less than the second number of pole-pairs.

U.S. Pat. No. 9,219,395 for Large magnetically geared machines by inventors Powell et al., filed May 17, 2011 and issued Dec. 22, 2015, discloses an electrical machine comprising a first rotor, wherein the first rotor includes a support structure, a second rotor, a stator and, wherein the first rotor, second rotor and stator are arranged concentrically about a shaft, and at least one of the second rotor and the stator is adapted to accommodate the support structure. An electrical machine is also provided comprising a shaft having an axis, at least one first rotor, at least one second rotor, at least two stators, and, wherein the first rotor, second rotor and stators are arranged axially along the shaft and extend from the axis.

U.S. Pat. No. 3,378,710 for Magnetic transmission by inventor Martin, filed Jun. 1, 1964 and issued Apr. 16, 1968, discloses a magnetic drive similar to a planetary gear mechanical drive. Three elements having a common axis of revolution are provided, namely an outer ring magnet, an intermediate planet ring having a plurality of substantially radial magnetically permeable bars, and a sun magnet. One of the elements is power-driven and a second element is then driven. The drive may be used to achieve a speed increase or decrease.

SUMMARY OF THE INVENTION

The present invention relates to magnetically actuated valve mechanisms, and more specifically to actuation via a torque-limiting first order magnetic coupling and including a position indication system to determine the actual position of a valve stem.

It is an object of this invention to provide a natural torque-limiting magnetic actuation mechanism for a valve, and to provide a position indication system for determining an absolute position of the valve mechanism.

In one embodiment, the present invention is directed to a magnetically actuated valve, including an actuator stem, rotation of which is configured to actuate the valve, causing the valve to move between an open position, a closed position, and one or more semi-open positions, an inner magnetic array, including a plurality of constituent magnets or a plurality of distinct magnetic domains, surrounding a segment of the actuator stem, a valve housing, defining a pressure vessel of the valve, encapsulating the actuator stem and the inner magnetic array, and an outer magnetic array surrounding a section of the valve housing, wherein the plurality of constituent magnets or the plurality of distinct magnetic domains in the inner magnetic array have alternating polarities, and wherein actuation of the outer magnetic array applies torque to the inner magnetic array, thereby causing the actuator stem to rotate.

In another embodiment, the present invention is directed to a magnetically actuated valve, including an actuator stem, rotation of which is configured to actuate the valve, causing the valve to move between an open position, a closed position, and one or more semi-open positions, a valve stem coupled to the actuator stem via one or more gearing mechanisms, a ferromagnetic strip attached to a portion of the valve stem, an inner magnetic array, including a plurality of constituent magnets or a plurality of distinct magnetic domains, surrounding a segment of the actuator stem, a valve housing, defining a pressure vessel of the valve, encapsulating the actuator stem, the valve stem, and the inner magnetic array, an outer magnetic array surrounding a section of the valve housing, and a position indicator attached to an outside surface of the valve housing configured to detect a configuration of the valve based on detecting a position of the ferromagnetic strip, wherein actuation of the outer magnetic array applies torque to the inner magnetic array, thereby causing the actuator stem to rotate.

In yet another embodiment, the present invention is directed to a magnetically actuated valve, including an actuator stem, rotation of which is configured to actuate the valve, causing the valve to move between an open position, a closed position, and one or more semi-open positions, an inner magnetic array, including a plurality of constituent magnets or a plurality of distinct magnetic domains, surrounding a segment of the actuator stem, a valve housing, defining a pressure vessel of the valve, encapsulating the actuator stem and the inner magnetic array, an outer magnetic array surrounding a section of the valve housing, and a plurality of radially spaced apart ferrous elements embedded in a wall of the valve housing proximate to the inner magnetic array and the outer magnetic array, wherein actuation of the outer magnetic array applies torque to the inner magnetic array, thereby causing the actuator stem to rotate.

These and other aspects of the present invention will become apparent to those skilled in the art after a reading of the following description of the preferred embodiment when considered with the drawings, as they support the claimed invention.

DETAILED DESCRIPTION

Figure 1:
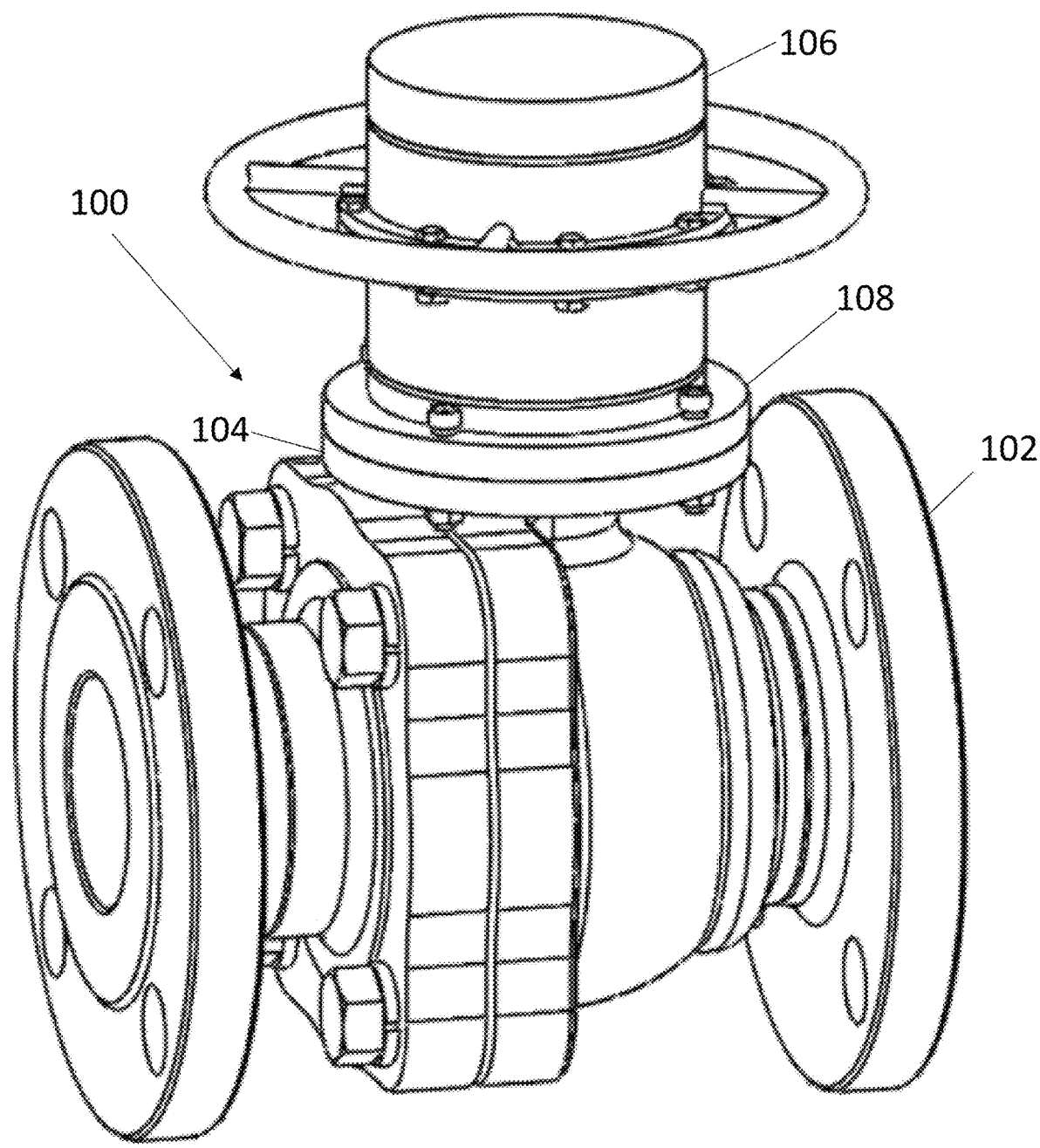
FIG. 1 illustrates a perspective view of a magnetically actuated pipe valve according to one embodiment of the present invention.

The present invention is generally directed to magnetically actuated valve mechanisms, and more specifically to actuation via a torque-limiting first order magnetic coupling and including a position indication system to determine the actual position of a valve stem.

In one embodiment, the present invention is directed to a magnetically actuated valve, including an actuator stem, rotation of which is configured to actuate the valve, causing the valve to move between an open position, a closed position, and one or more semi-open positions, an inner magnetic array, including a plurality of constituent magnets or a plurality of distinct magnetic domains, surrounding a segment of the actuator stem, a valve housing, defining a pressure vessel of the valve, encapsulating the actuator stem and the inner magnetic array, and an outer magnetic array surrounding a section of the valve housing, wherein the plurality of constituent magnets or the plurality of distinct magnetic domains in the inner magnetic array have alternating polarities, and wherein actuation of the outer magnetic array applies torque to the inner magnetic array, thereby causing the actuator stem to rotate.

In another embodiment, the present invention is directed to a magnetically actuated valve, including an actuator stem, rotation of which is configured to actuate the valve, causing the valve to move between an open position, a closed position, and one or more semi-open positions, a valve stem coupled to the actuator stem via one or more gearing mechanisms, a ferromagnetic strip attached to a portion of the valve stem, an inner magnetic array, including a plurality of constituent magnets or a plurality of distinct magnetic domains, surrounding a segment of the actuator stem, a valve housing, defining a pressure vessel of the valve, encapsulating the actuator stem, the valve stem, and the inner magnetic array, an outer magnetic array surrounding a section of the valve housing, and a position indicator attached to an outside surface of the valve housing configured to detect a configuration of the valve based on detecting a position of the ferromagnetic strip, wherein actuation of the outer magnetic array applies torque to the inner magnetic array, thereby causing the actuator stem to rotate.

In yet another embodiment, the present invention is directed to a magnetically actuated valve, including an actuator stem, rotation of which is configured to actuate the valve, causing the valve to move between an open position, a closed position, and one or more semi-open positions, an inner magnetic array, including a plurality of constituent magnets or a plurality of distinct magnetic domains, surrounding a segment of the actuator stem, a valve housing, defining a pressure vessel of the valve, encapsulating the actuator stem and the inner magnetic array, an outer magnetic array surrounding a section of the valve housing, and a plurality of radially spaced apart ferrous elements embedded in a wall of the valve housing proximate to the inner magnetic array and the outer magnetic array, wherein actuation of the outer magnetic array applies torque to the inner magnetic array, thereby causing the actuator stem to rotate.

In order to prevent leakage of potentially harmful fluids, it is important that many pipelines (e.g., oil and gas pipelines, pipelines holding noxious chemicals, cryogenic hydrogen or helium pipelines) remain fully sealed. Preventing leakage requires reliable valve mechanisms that both allow an operator to halt flow of fluid through the pipeline and which prevent leakage of the fluid through the valve mechanism. The issue of leakage has become especially poignant in recent years, as fugitive emissions have been discovered to have occurred at a much greater scale than previously imagined, increasing the need for a truly sealed system. Leakage has taken on greater importance as governments have moved toward net zero carbon policies to reduce emissions. Recent technology for monitoring and measuring leakage, such as Forward Looking Infrared (FLIR) cameras, has revealed leaks in prior art valves which have previously not been identified. Accordingly, there is a need to replace or retrofit these valves with technology which does not allow for fugitive emissions.

The most typical way for pipe valves to work is for a stem to extend through a section of the valve, with gaskets sealing where it rises out. The stem is able to rise (or lower) or be turned to actuate the valve, causing the valve to open or close. However, one of the issues of this system for leakage is that the gaskets frequently break down over time, causing small amounts to leak, even if there is not a catastrophic failure of the system. Some systems have attempted to deal with this issue by encasing the stem in a valve housing and magnetically actuating the valve instead. Examples of such systems include the system described in U.S. Pat. No. 10,221,959. However, the '959 patent, like other similar prior art systems, has an issue supplying sufficiently high torque in order to actuate the valve, especially for higher pressure systems. This problem arises, in part, because the system requires that a magnetic mechanism outside of a sealed container to act on a metal component within the sealed container. The boundary separating the external magnet from the internal component weakens the magnetic force able to be applied inside. This issue intensifies for higher pressure applications, as the walls of the valve housing must be made larger in order to be able to withstand increased pressures, further weakening the magnetic connection. For many cases, including the most applicable gases in industries such as oil and gas, this renders existing magnetic valve systems effectively useless or at least extremely limited, leading to decreased adoption. Therefore, what is needed is a mechanism to strength the magnetic connection between external magnetic components and internal components of a magnetic valve actuation system.

Furthermore, the use of magnetically coupled arrays for actuation in valve systems has much different concerns from any prior art systems that utilize magnetically coupled array actuation systems in pumps, motors, or other high speed power transfer applications. Valves typically only require the actuator to turn between 0.25 revolutions and 20 revolutions, depending on the type of valve, while pumps often require much more continuous rotation in order to keep the fluid pumping.

The use of externally coupled magnetic array actuators to control the position of a valve, however, creates unique problems not faced in, for example, motors that use magnetic gearing. For example, while, for motors, the only real concern is the rate of rotation, meaning that high-speed, low-torque applications are important, valves are used for high-torque, low-speed applications and the position, not only the speed, of the valve is important. Generally, the position of the valve is able to be determined by the amount the valve and/or valve stem is rotated, but this is complicated if the magnetically coupled arrays ever slip a position during the course of rotation. In the event the magnetically coupled arrays slips, without sensing the actual position of the valve, the valve is unlikely to be closed or open to the desired position in future applications, potentially causing damage or waste within the system. One solution for determining the position of a valve is to include a transparent window in the pressure vessel of the valve such that an engineer is able to see inside, but relying on this sort of visual inspection obviates many of the benefits of remotely actuating the valve and is often not practical if the valve is fit into a tight, hard-to-see location. Therefore, with the use of remotely actuated magnetic coupling system comes a need for a method of determining the position of the valve without requiring visual inspection and without requiring an engineer to puncture the pressure vessel.

Furthermore, the ability of the magnetic coupling system to slip actually provides a benefit for the system relative to non-magnetically actuated valve mechanisms. In physical valve systems, overturning the valve mechanism often leads to high stress on the valve stem or other internal valve components that sometimes cause the components to break and possibly cause the valve to rupture. For example, a magnetic coupling system, as used in the present invention, is able to be configured such that internal and external arrays that comprise the magnetic coupling system begin to slip once a maximum allowable stem torque (MAST) has been exceeded. Therefore, once the valve is in a position where further rotation of the drive shaft requires a greater torque than the MAST, instead of additional force causing the drive shaft to overturn and potentially damage the internal valve mechanism, the magnetic arrays simply begin to slip relative to each other. The position indication system therefore, allows the system to harvest the benefit of this natural clutch, or torque-limiting mechanism, while also obviating the issuer that the position of the external magnetic array no longer corresponds with the position of the valve stem by providing the position indicator.

Referring now to the drawings in general, the illustrations are for the purpose of describing one or more preferred embodiments of the invention and are not intended to limit the invention thereto.

The present invention provides a zero fugitive emissions valve that is manipulated without emitting greenhouse gases, thereby addressing prior art issues with valve leakage. The present invention also provides a valve with a clutch that prevents overturning issues and does not need to rely upon automatic stem breakage to address overturning. This invention therefore addresses prior art issues of valve breakage due to the valve being over torqued.

Figure 2:
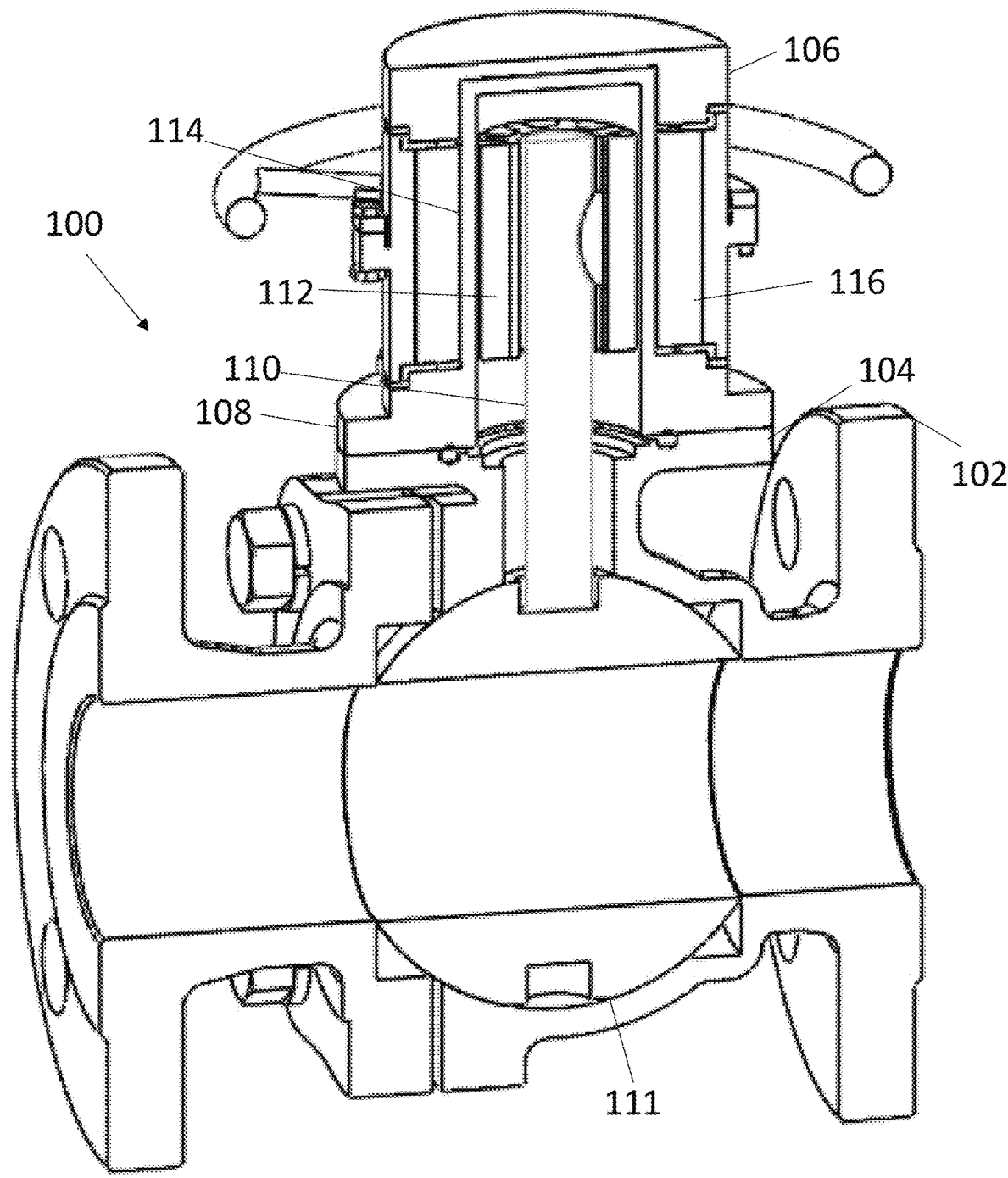
FIG. 2 illustrates a sectional view of the magnetically actuated pipe valve of FIG. 1.

FIGS. 1-2 illustrate a magnetically actuated pipe valve according to one embodiment of the present invention. A pipe valve mechanism 100 includes a section of pipe 102. A top plate 104 extends upwardly from the section of the pipe 102. A ball valve 111 is positioned within a lumen of the section of pipe 102. The ball valve 111 includes a central lumen. When the ball valve 111 is in an open position, the central lumen of the ball valve 111 substantially aligns with the lumen of the pipe 102. In a closed position, the central lumen of the ball valve 111 is oriented substantially orthogonally, and is therefore not aligned with the lumen of the pipe 102.

The ball valve 111 is attached to and rotationally coupled with a valve stem 110 extending through the top plate 104 of the pipe valve mechanism 100. The section of the valve stem 110 above the top plate 104 is surrounded by and enclosed by a valve housing 114 sealingly attached to the top plate 104. The valve housing 114 includes a substantially cylindrical section (or otherwise shaped) and a bottom base plate 108. The base plate 108 is sealingly attached to the top plate 104 via nuts and bolts, screws, adhesive, welding, latches and/or any other conventional means of attachment known in the art.

Within the valve housing 114, at least one internal magnetic array 112 surrounds the valve stem 110. In one embodiment, the at least one internal magnetic array 112 is attached to an inner wall of the valve housing 114 via screws, nuts and bolts, adhesive, welding, and/or any other means of attachment known in the art. In another embodiment, the at least one internal magnetic array 112 is attached to an outer surface of a section of the valve stem 110 via screws, nuts and bolts, adhesive, welding, and/or any other means of attachment of known in the art. In yet another embodiment, the at least one internal magnetic array 112 is coupled with the outer surface of the section of the valve stem 110 via frictional engagement. The valve housing 114 is surrounded by a magnetic housing 106, wherein the magnetic housing 106 includes at least one external magnetic array 116 circumferentially surrounding a section of the valve housing 114. In one embodiment, the at least one internal magnetic array 112 includes a plurality of magnets arranged in a ring having alternating polarity (e.g., North directed outwardly, North directed inwardly, North directed outwardly, etc.) circumferentially around the at least one internal magnetic array 112. In one embodiment, the at least one external magnetic array 116 includes a plurality of magnets having alternating polarity (e.g., North directed outwardly, North directed inwardly, North directed outwardly, etc.) circumferentially around the at least one external magnetic array 116.

One of ordinary skill in the art will understand that although the application primarily refers to the components of the first order magnetic coupling as internal and external magnetic arrays, each magnetic array is able to substituted, in any embodiment described herein, with a ring magnet having domains of different polarities as well.

One of ordinary skill in the art will understand that the magnetic actuation system with magnetic gear reduction described herein is not limited to valves shaped and configured as shown in FIGS. 1 and 2. The alternating magnets are able to be used in both quarter turn (e.g., ball valves, plug valves, butterfly valves, etc.) and rising stem valves (gate valve, needle valve, globe valve, etc.) and in valves having various combinations of physical gear reduction systems or direct drive, such as is described in patents including, but not limited to, U.S. Pat. Nos. 9,377,121, 9,702,469, 8,496,228, and/or 8,690,119, each of which is incorporated herein by reference in its entirety.

Figure 3A:
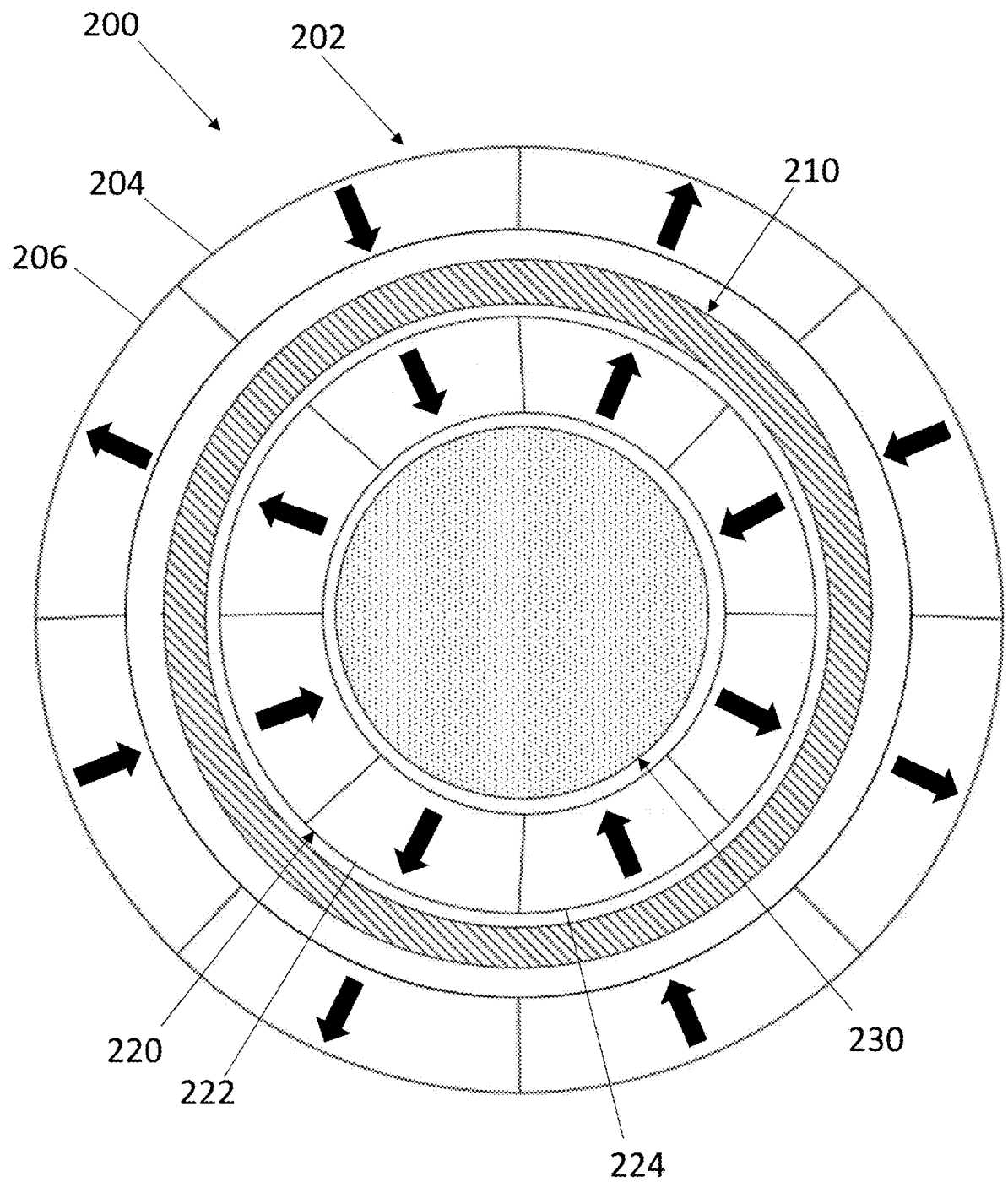
FIG. 3A illustrates a diagram of a first order magnetic actuation mechanism with alternating magnetic arrays for a pipe valve according to one embodiment of the present invention.
Figure 3B:
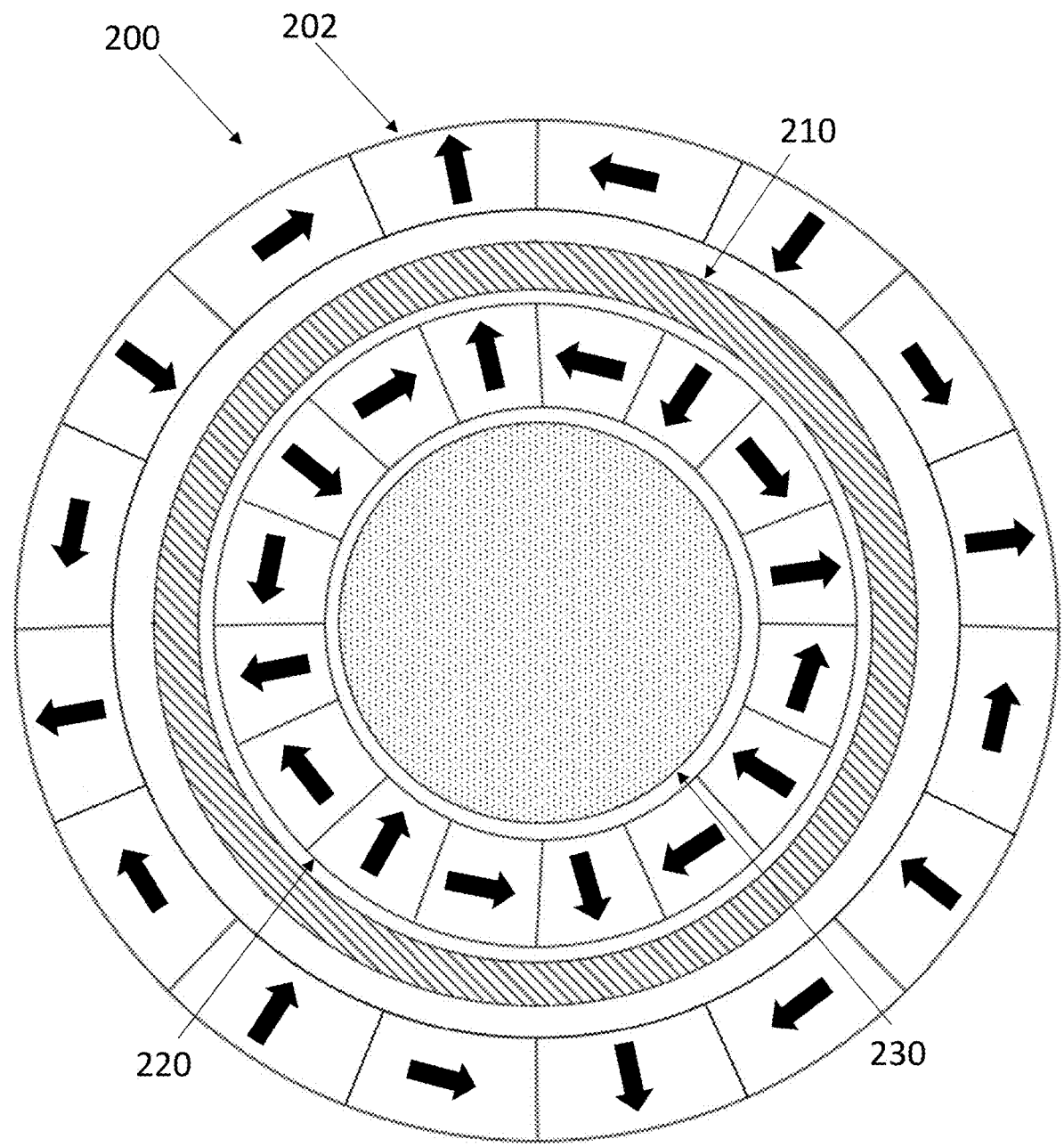
FIG. 3B illustrates a diagram of a first order magnetic actuation mechanism with Halbach arrays for a pipe valve according to one embodiment of the present invention.

FIG. 3A-3B illustrate diagrams of a first order magnetic actuation mechanisms for a pipe valve according to one embodiment of the present invention. A magnetic valve mechanism 200 includes a valve drive shaft 230. The valve drive shaft 230, when rotated, actuates the valve mechanism 200 causing the valve mechanism 200 to change between an open position and a closed position, either directly or indirectly (e.g., via rotating other gears and/or rotors that are directly coupled with the valve). The valve drive shaft 230 is surrounded by at least one internal magnetic array 220, fully circumferentially surrounding the valve drive shaft 230. The at least one internal magnetic array 220 includes a plurality of magnets having alternating polarity (i.e., including a domain with North directed outwardly 224, an adjacent section of North directed inwardly 222, then another section of North directed outwardly, etc.) arranged circumferentially about the at least one internal magnetic array 220. The at least one internal magnetic array 220 is encased by a valve housing 210. In one embodiment, the valve housing 210 is formed from a18 non-ferromagnetic material such that it does not substantially interfere with the magnetic connection between the at least one internal magnetic array 220 and at least one external magnetic array 202. The at least one external magnetic array 202 surrounds a section of the valve housing 210 and is positioned such that turning the at least one external magnetic array 202 induces a magnetic force on the at least one internal magnetic array 220, causing the latter to turn. In one embodiment, similar to the at least one internal magnetic array 220, the at least one external magnetic array 202 includes a plurality of magnets having alternating polarity (i.e., including a domain with North directed outwardly 206, an adjacent section of North directed inwardly 204, then another section of North directed outwardly, etc.) arranged circumferentially about the at least one external magnetic array 202.

In a preferred embodiment, the at least one internal magnetic array 220 includes the same number of magnets as the at least one external magnetic array 202. One of ordinary skill in the art will understand that the number of magnets used for each array is able to vary. For example, FIG. 3A shows arrays having 8 magnets each, while FIG. 3B shows arrays having 16 magnets each, but any other number of magnets (preferably an even number of magnets) are able to be used, including 6 magnets, 10 magnets, 12 magnets, 20 magnets, 100 magnets, and so on. However, one of ordinary skill in the art will understand that this system is able to be replaced with an internal magnetic array having a greater number of magnets than the external magnetic array (as shown below in FIGS. 4A and 4B) in order to provide gear reduction and increased applied torque.

The alternating pattern of domains allows rotation of the at least one external magnetic array 202 to cause the at least one internal magnetic array 220 to turn, via magnetic coupling. Therefore, rotating the at least one external magnetic array 202, which is notably outside the pressure vessel of the valve 200 (i.e., outside of the valve housing 210), causes the at least one internal magnetic array 220 to also rotate, thereby actuating the valve, without any direct connection being required between the interior and exterior of the pressure vessel, thereby greatly reducing likelihood of leakage.

In one embodiment, the at least one external magnetic array 202 is manually driven or operated. In this embodiment, an operator is able to manually turn the at least one external magnetic array 202 in order to turn the shaft and therefore actuate the valve 200. In another embodiment, the at least one external magnetic array 202 is connected to at least one actuator (e.g., electric motor, pneumatic actuator, hydraulic actuator, etc.), operable to automatically rotate the at least one external magnetic array 202 at a fixed speed and/or a fixed torque. In one embodiment, the at least one actuator includes a wireless receiver, operable to receive instructions from a remote user device (e.g., a cell phone, a computer, a tablet, etc.) to actuate the valve. In one embodiment, the at least one actuator acts automatically based on feedback from one or more sensors connected to the valve 200 (e.g., at least one pressure sensor, wherein the actuator automatically opens the valve when pressure passes a preset threshold, at least one position indication sensor, etc.).

In one embodiment, as shown in FIG. 3B, the magnetic coupling system utilizes annular Halbach arrays for the at least one internal magnetic array 220 and/or the at least one external magnetic array 202. Halbach arrays have a specific orientation of adjacent magnetic domains that provide for an increased magnetic field on one side of the array and a near zero magnetic field on the other side of the array. In the embodiment shown in FIG. 3B, the Halbach array of the at least one internal magnetic array 220 is oriented such that the side with the increased magnetic field is directly outwardly and the at least one external magnetic array 202 is directed such that the side with the increased magnetic field is directly inwardly, strengthening the coupling between the two arrays.

Halbach arrays are known in the art and involve a pattern of magnetic domains wherein magnetic north is arranged to face left, up, right, down, repeating, wherein the side with the greater magnetic field is "down" while the "up" direction has near zero magnetic field. Examples of systems utilizing Halbach arrays include U.S. Pat. No. 9,876,407, which is incorporated herein by reference in its entirety. However, one of ordinary skill in the art will understand that other orientations of Halbach arrays are also compatible with the present invention.

While FIGS. 3A and 3B show both inner and outer magnetic arrays, in one embodiment, the system only includes an outer magnetic array operable to act on paramagnetic (e.g., ferrous) elements connected to the actuator stem. The increased strength of the Halbach array allows for this set-up to apply sufficient torque to turn the valve even with the decreased coupling strength as a result of not including the inner magnetic array.

Figure 4A:
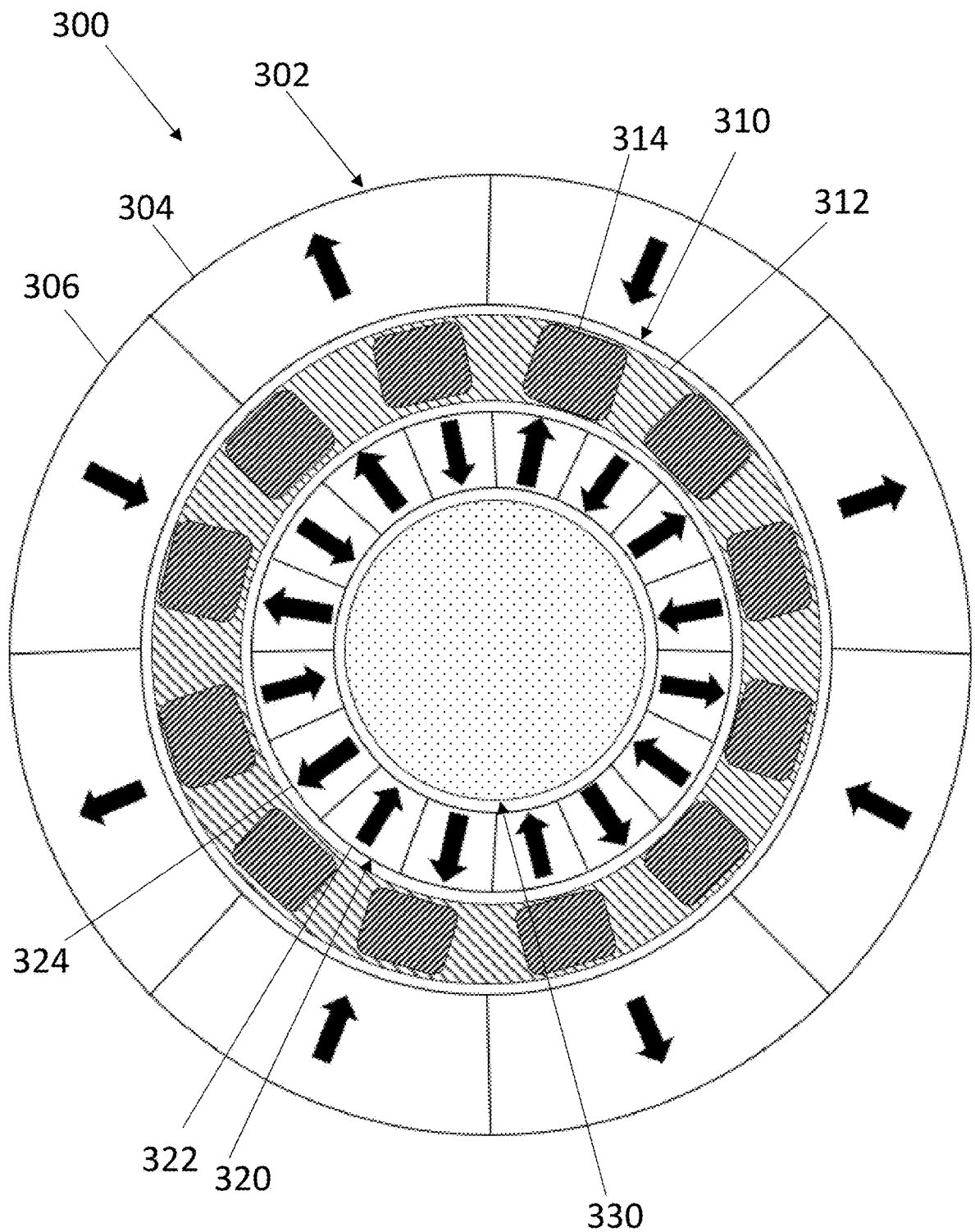
FIG. 4A illustrates a diagram of a magnetic actuation mechanism with alternating magnetic gear reduction for a pipe valve according to one embodiment of the present invention.
Figure 4B:
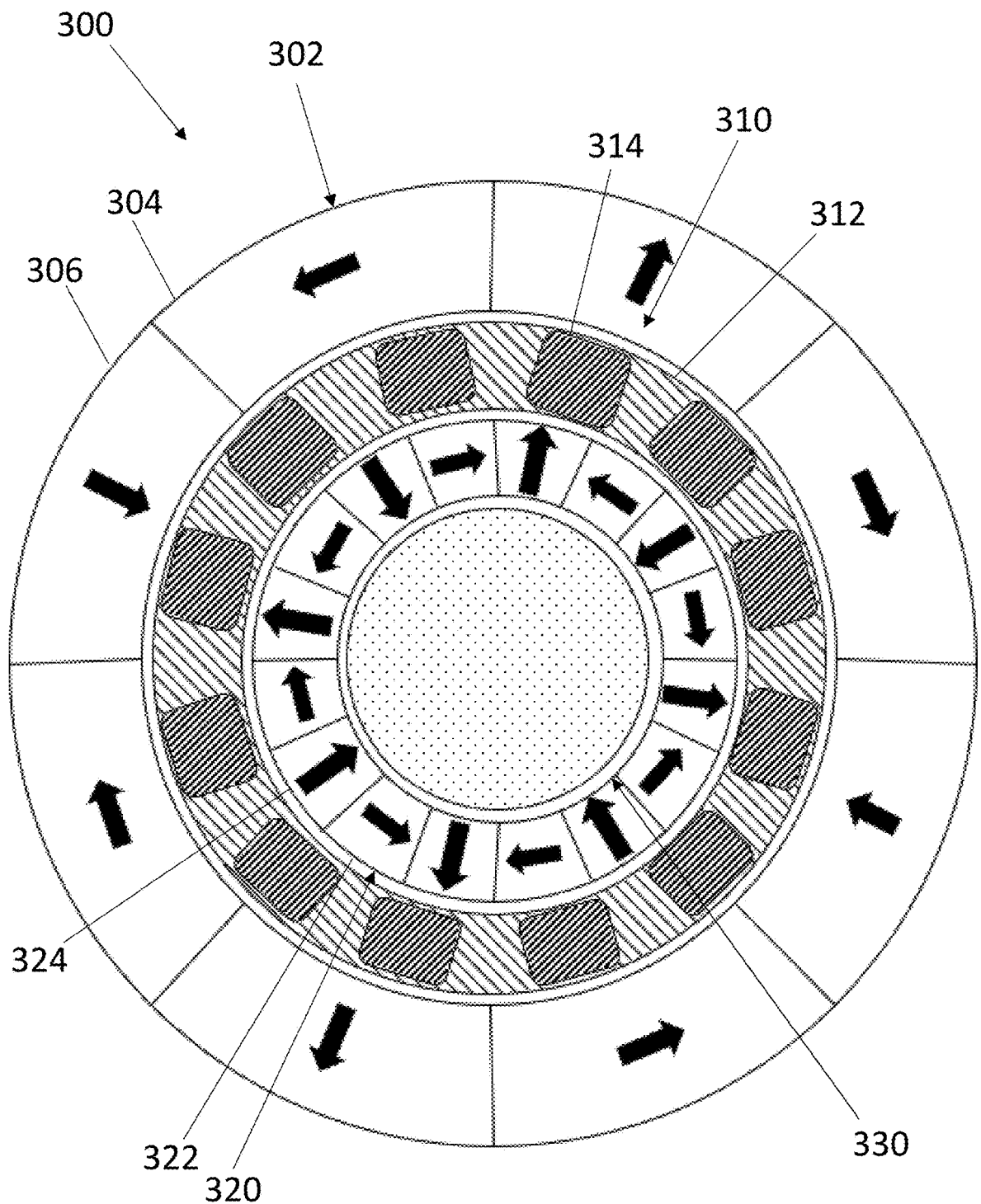
FIG. 4B illustrates a diagram of a magnetic actuation mechanism with Halbach array-based magnetic gear reduction for a pipe valve according to one embodiment of the present invention.

FIG. 4A-4B illustrate diagrams of magnetic actuation mechanisms with magnetic gear reduction for a pipe valve according to one embodiment of the present invention. A magnetic valve mechanism 300 includes a valve drive shaft 330. The valve drive shaft 330, when rotated, actuates the valve mechanism 300 causing the valve mechanism 300 to change between an open position and a closed position, either directly or indirectly (e.g., via rotating other gears and/or rotors that are directly coupled with the valve). The valve drive shaft 330 is surrounded by at least one internal magnetic gear 320, fully circumferentially surrounding the valve drive shaft 330. The at least one internal magnetic gear 320 includes a plurality of magnets, arranged in a ring, having alternating polarity (i.e., including a domain with North directed outwardly 324, an adjacent section of North directed inwardly 322, then another section of North directed outwardly, etc.) arranged circumferentially about the at least one internal magnetic gear 320. The at least one internal magnetic gear 320 is encased by a valve housing 310. At least one external magnetic gear 302 surrounds a section of the valve housing 310 and is positioned such that turning the at least one external magnetic gear 302 induces a magnetic force on the at least one internal gear 320, causing the latter to turn.

In one embodiment, the bulk material 312 of the valve housing 310 is formed from a non-ferromagnetic material. However, in one embodiment, one or more ferrous or otherwise ferromagnetic elements 314 (e.g., ferrous mods, ferrous discs, ferrous cubes, etc.) are included in the side wall of the valve housing 310 between the at least one internal magnetic gear 320 and the at least one external magnetic gear 302. In one embodiment, the number of ferrous elements 314 included circumferentially in the side wall of the valve housing 310 is equal to the sum of the number of magnets in the at least one internal magnetic gear 320 and the number of magnets in the at least one external magnetic gear 302 divided by two. For example, in FIGS. 4A and 4B, the at least one internal magnetic gear 320 includes 16 distinct magnetic domains and the at least one external magnetic gear 302 includes 8 distinct magnetic domains, and there are therefore 12 ferrous elements 314 distributed equidistant around the circumference of the valve housing 310. The ferrous elements 314 help to "conduct" and channels the magnetic field to increase the strength of the magnetic connection and provide for increased torque. This conduction is particularly useful in this use case and solves a long-felt, unmet need in the art of valves by allowing for the magnetic connection between the inner ring and the outer ring to remain strong, even if the thickness of the valve housing 310 increases in order to withstand greater pressures within the pressure vessel of the valve. This problem is particularized to valves, and yet no prior invention has thought to improvement valves through magnetic gearing and specifically improvements to magnetic gearing using embedded ferrous elements 314 within the valve housing itself. Notably, the inclusion of the ferrous elements in the walls of a pressure vessel (i.e., the valve housing 310) is distinct from prior art systems. Prior art systems, such as that described in U.S. Pat. No. 9,444,318 utilize a middle ring including "pole pieces" but the middle ring in this invention and in other inventions tends to be another cylinder, which either remains static or rotates along with the other components. However, this middle ring is not a section of a larger component, nor is it specifically part of a pressurized vessel.

In one embodiment, the ferrous elements 314 are replaced with one or more radially magnetized permanent magnets, also embedded in the valve housing 310. The radially magnetized permanent magnets allow for even greater magnetic gear reduction and coupling between the at least one internal magnetic gear and the at least one external magnetic gear.

In one embodiment, similar to the at least one internal magnetic gear 320, the at least one external magnetic gear 302 includes a plurality of magnets arranged having alternating polarity (i.e., including a domain with North directed outwardly 304, an adjacent section of North directed inwardly 306, then another section of North directed outwardly, etc.) arranged circumferentially about the at least one external magnetic gear 302.

In a preferred embodiment, the at least one internal magnetic gear 320 includes a greater number of individual magnetic domains than the at least one external magnetic gear 302. In another embodiment, the at least one internal magnetic gear 320 includes fewer individual magnetic domains than the at least one external magnetic gear 302. One of ordinary skill in the art will understand that the number of magnets shown in FIG. 3A are only exemplary, and not intended to be limiting as to the number able to be used in each magnetic gear. For example, the at least one internal magnetic gear 320 is able to include, but is not limited to, four, five, six, eight, ten, twelve, twenty, fifty, one hundred, or any other number of magnets. Similarly, the at least one internal magnetic gear 302 is able to include, but is not limited to, four, five, six, eight, ten, twelve, twenty, fifty, one hundred, or any other number of magnets. In one embodiment, the inner magnetic array includes 2×, 4×, 8×, 16×, 64×, 80×, or any number of times greater quantity of magnetic domains relative to the outer magnetic array, with greater multiples being more useful for larger valves. In another embodiment, the at least one internal magnetic gear 320 includes fewer individual magnetic domains than the at least one external magnetic gear 302.

The alternating pattern of magnets allows rotation of the at least one external magnetic gear 302 to cause the at least one internal magnetic gear 320 to turn, via a magnetic gearing mechanism. The individual magnets of each magnetic gear act analogously to teeth in a physical gearing system. Therefore, rotating the at least one external magnetic gear 302, which is notably outside the pressure vessel of the valve 300 (i.e., outside of the valve housing 310), causes the at least one internal magnetic gear 320 to also rotate, thereby actuating the valve, without any direct connection being required between the interior and exterior of the pressure vessel, thereby greatly reducing likelihood of leakage. Furthermore, when the at least one internal magnetic gear 320 and the at least one external magnetic gear 302 are stationary, magnets of the magnetic gears are aligned such that magnets of the at least one internal magnetic gear 320 are directly across from oppositely oriented magnets of the at least one external magnetic gear 302, keeping the magnets attracted to that position. Additionally, the two magnets surrounding said oppositely oriented magnets are oriented such that they resist rotation of the valve without applied torque, creating resistance to unintended movement that helps stabilize the valve.

The number of individual magnets for each magnetic gear is important. The magnetic gear with a greater number of individual magnets needs to rotate across a smaller arc in order to rotate the magnetic gear with greater domains across a larger arc. However, having the magnetic gear with the smaller number of magnets on the exterior of the valve 300 is advantageous, as it allows for greater torque to be applied in turning the valve 300, which is important for high pressure environments such as inside the valve 300. In one embodiment, the gear ratio is based on the total number of magnets in each magnetic gear. For example, if one magnetic gear includes 16 magnets and the other magnetic gear includes 8 magnets, then the gear ratio is 2. In this embodiment, a single turn of the magnetic gear with 16 magnets causes 2 full turns of the magnetic gear with 8 magnets, while a single turn of the magnetic gear with 8 magnets only causes half a turn of the magnetic gear with 16 magnets.

In one embodiment, the at least one external magnetic gear 302 is manually driven or operated. In this embodiment, an operator is able to manually twist the at least one external magnetic gear 302 in order to turn the shaft and therefore actuate the valve 300. In another embodiment, the at least one external magnetic gear 302 is connected to at least one actuator (e.g., electric motor, pneumatic actuator, hydraulic actuator, etc.), operable to automatically rotate the at least one external magnetic gear 302 at a fixed speed and/or at a fixed torque. In one embodiment, the at least one actuator includes a wireless receiver, operable to receive instructions from a remote user device (e.g., a cell phone, a computer, a tablet, etc.) in order to actuate the valve. In one embodiment, the at least one actuator acts automatically based on feedback from one or more sensors connected to the valve 300 (e.g., at least one pressure sensor, wherein the actuator automatically opens the valve when pressure passes a preset threshold). In one embodiment, the at least one actuator is operable to receive commands from at least one server and/or at least one processor indicating an amount to turn the at least one external magnetic gear and/or a desired valve position (e.g., fully closed, fully open, 25% open, 50% open, etc.). The at least one actuator then automatically turns the at least one external magnetic gear 302 by the commanded amount or by an amount that will generate the desired valve position (e.g., if twelve rotations will open the valve 50%). In one embodiment, the at least one actuator includes a memory configured to store an amount that the at least one actuator rotated the at least one magnetic gear 302 with previous commands and/or one or more previous valve states for the valve. This is important as the amount that the valve needs to be rotated to reach a desired valve position is necessarily based on the amount that valve had been rotated in the past or the previous valve positions.

In one embodiment, as shown in FIG. 4B, the magnetic gearing system utilizes annular Halbach arrays for the at least one internal magnetic gear 320 and/or the at least one external magnetic gear 302. Halbach arrays have a specific orientation of adjacent magnets that provide for an increased magnetic field on one side of the array and a near zero magnetic field on the other side of the array. In the embodiment shown in FIG. 4B, the Halbach array of the at least one internal magnetic gear 320 is oriented such that the side with the increased magnetic field is directly outwardly and the at least one external magnetic gear 302 is directed such that the side with the increased magnetic field is directly inwardly, strengthening the coupling between the two magnetic gears. Halbach arrays allow for increased coupling strength that allows for thicker walls of the valve housing without comprising the ability for the outer magnetic array to apply sufficient torque to the inner stem.

Advantageously, the system utilizes the external magnetic array as the rotating element to drive the system, but the external magnetic array is not tightly coupled to any physical gearing or internal components of the system. Furthermore, the maximum torque applicable by the external magnetic array is based on inherent characteristics of the array (e.g., number of magnets, magnetic field strength, distance between the inner and outer arrays, etc.). This is useful as, in one embodiment, the maximum torque is designed such that the torque is incapable of overcoming the resistance of the gearing when the valve is in a fully open or fully closed position. Therefore, the magnetic gearing is able to act as a sort of infinite shear pin, or clutch, preventing damage to the valve as a result of overturning by allowing slippage past the maximum allowable torque. When the system attempts to turn the valve past a point of being fully open or fully closed, instead of continuing to turn the internal components, the external magnetic gearing will simply slip and keep rotating, preventing damage to the internal components. The alternating magnets shown in FIGS. 3A and 3B include a repeating north-south and south-north coupling around the whole array. The alternating magnets are configured to break the coupling, or "slip" when the magnetic valve is over torqued. When the alternating magnets are over torqued, the alternating magnets are temporarily (e.g., for a fraction of a second) moved to be in a position where there is a north-north and south-south pairing, which repels the components. The repulsion between the north-north and south-south pairings is less than the attraction between the north-south and south-north parings, so the array continues to automatically move from the repulsive north-north and south-south pairings to the next attractive north-south and south-north pairing. This functionality of the clutch provides for a leak free magnetic clutch or a zero fugitive emissions magnetic clutch. Because of the circular geometry, tight spacing of the magnets, and the repulsion of North-North or South-South when the magnets skip, the magnets automatically realign when a "clutch break" moment happens. The magnets quickly jump to the next magnetic coupling in the array and self-align to the magnetic coupling of the maximum allowable torque the clutch will allow. The present invention accordingly provides for a magnetic coupling which is strong enough to actuate a valve and which protects a stem from breaking in the valve is over torqued. In one example, the maximum allowable torque for the valve is 100 inch pounds. If the torque reaches 120 inch pounds, the magnetic array rotates, "jumps" past the repulsive configuration (north-north and south-south), and recouples in an attractive configuration (north-south and south-north). Once the arrays recouple, the maximum allowable torque is once again set at 100 inch pounds without any need for user interaction and without the valve or any valve components breaking. This configuration solves the issues with many automatic valves, in which it is possible to overactuate the valve and break off the stem. The magnetic gears are operable to be an array other than just a 1:1 array of magnets, allowing for a torque multiplier without the use of individual magnets which are larger or stronger. The present invention also provides for eliminating or reducing the use of metal gearing in some embodiments. The magnetic clutch functionality of the present invention is operable to be provided in newly installed valves and in retrofitted valves, where the retrofit is installed over the existing valve or in place of the bonnet.

Figure 5:
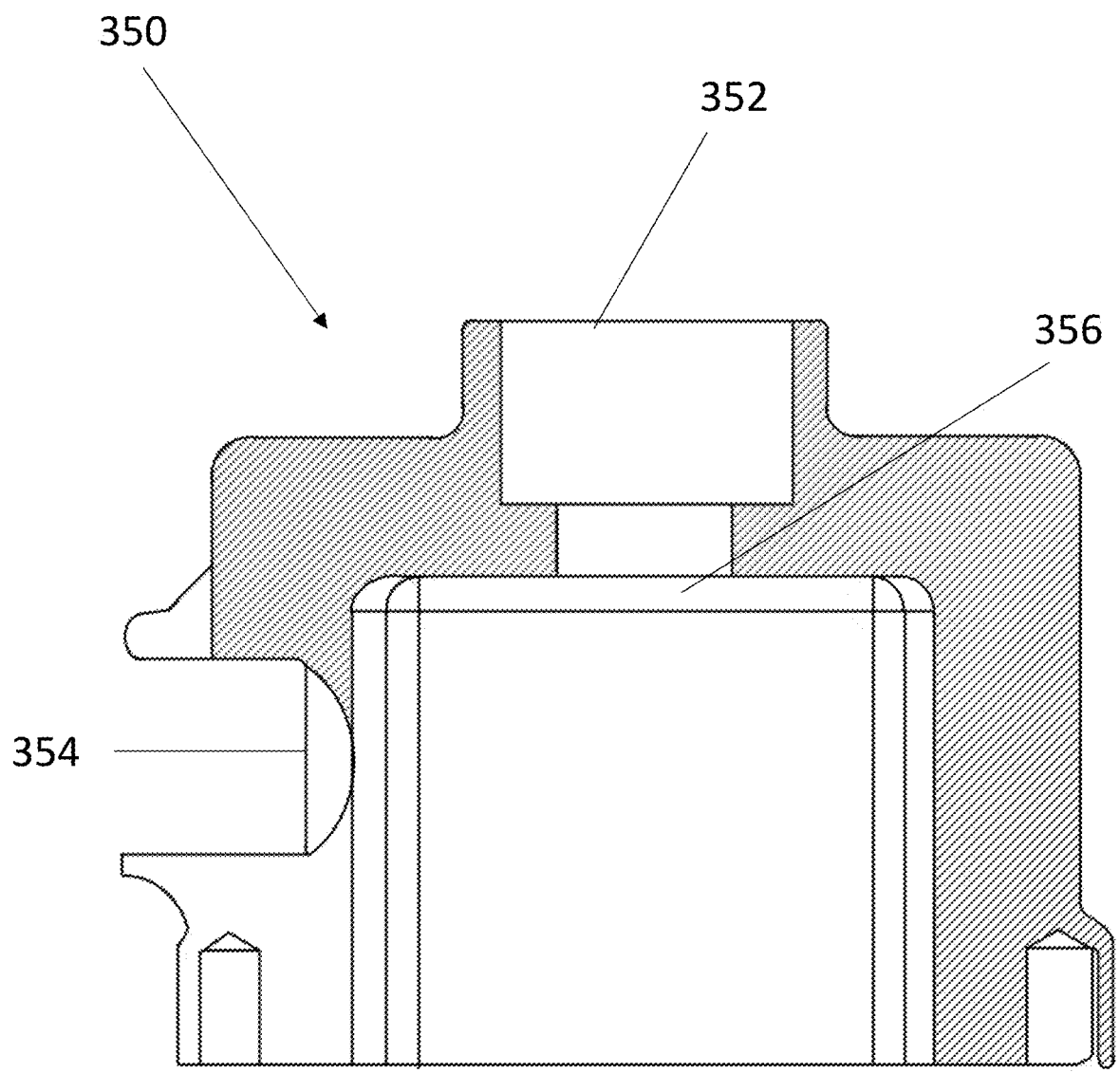
FIG. 5 illustrates a section of a magnetically actuated pipe valve including thin wall areas for inclusion of at least one position indicator sensor according to one embodiment of the present invention.

FIG. 5 illustrates a section of a magnetically actuated pipe valve including thin wall areas for inclusion of at least one position indicator sensor according to one embodiment of the present invention. The pipe valve 350 includes a thin-walled section 352, 354 configured to fit or attach to at least one position indication sensor. The thickness of the wall 356 of the pressure vessel in the vicinity of the thin-walled section 352, 354 is very thin, allowing the at least one position indication sensor to detect the position of a component within the pressure vessel (e.g., a magnet). In one embodiment, the at least one position indicator sensor includes at least one hall effect sensor. In one embodiment, the thin-walled section 352, 354 includes a threaded compartment operable to matingly connect with exterior threads of the at least one position indication sensor. In another embodiment, the thin-walled section 352, 354 is sized and shaped to fit the at least one position indication sensor, such that the at least one position indication sensor frictionally engages with the thin-walled sections 352, 354. In one embodiment, the thin-walled section 352, 354 is sealed to enclose the at least one position indication sensor. In one embodiment, the thin-walled section 352, 354 is created by drilling, or tapping, a section of an existing valve body without fully puncturing the wall of the valve housing or while allowing the punctured section of the wall to be resealed.

Figure 6:
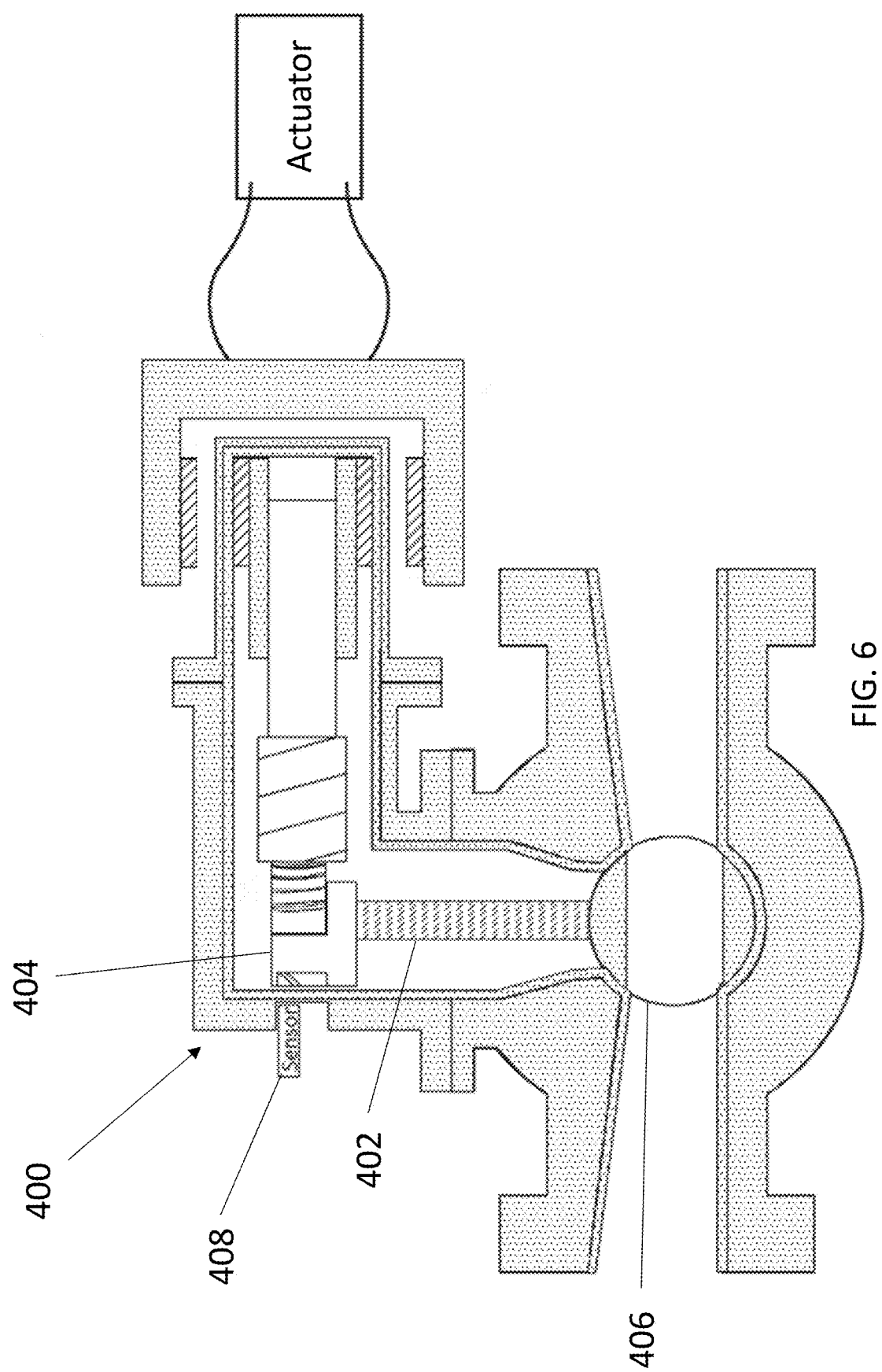
FIG. 6 illustrates a side sectional view of a magnetically actuated quarter-turn pipe valve including a position indication sensor according to one embodiment of the present invention.
Figure 7:
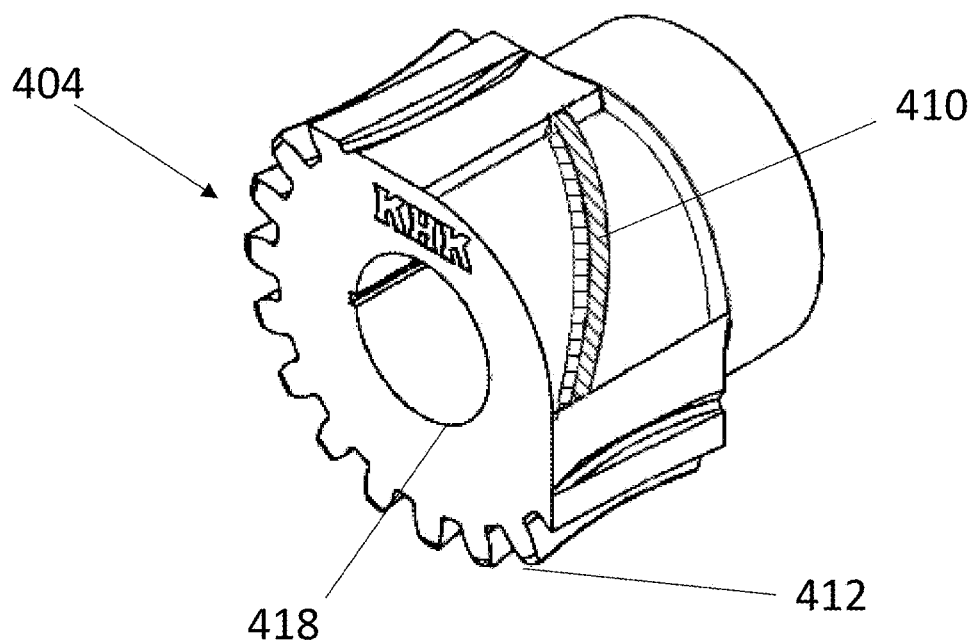
FIG. 7 illustrates a perspective view of a gear component of a magnetically actuated quarter-turn pipe valve including a magnetic strip for position indication according to one embodiment of the present invention.

FIG. 6 illustrates a side sectional view of a magnetically actuated quarter-turn pipe valve including a position indication sensor according to one embodiment of the present invention. Position indication is important in both quarter-turn and in rising stem valves, but the differing movement of internal components requires different positionings of the sensor and orientation of internal components. FIG. 6 shows one embodiment of a position indication sensor location for a quarter-turn valve housing 400. The quarter-turn valve housing 400 includes a shaft 402 coupled to a quarter-turn valve 406, such that rotation of the shaft 402 causes the quarter-turn valve 406 to open or close, partially or fully. At an end of the shaft 402 opposite the quarter-turn valve 406 is a gear 404 tightly coupled to the shaft 402, such that rotation of the gear 404 causes rotation of the shaft 402. The embodiment shown in FIG. 6 shows the gear 404 intermeshed with a second gear attached to a second shaft that is rotated by at least one internal magnetic array, but one of ordinary skill in the art will understand that any orientation of the remaining components of the valve are compatible with the present invention. A position indication sensor 408 is coupled to an exterior of the valve housing 400 proximate to the gear 404, preferably at a location of reduced wall thickness of the valve housing 400. The position indication sensor 408 is oriented such that it is directed orthogonally to a central axis of the shaft 402 and is aimed such that it is able to detect movement of components of the gear 404 (e.g., a magnetic strip as shown in FIG. 7). As the shaft 402 and the gear 404 turn, the position indication sensor 408 receives different readings for a component of the gear 404, allowing the position indication sensor 408 to generate valve orientation data including an absolute position of the quarter-turn valve 406. Because the gear 404 being detected by the position indication sensor 408 is tightly coupled to the central shaft and therefore to the quarter-turn valve 406 itself, the readings of the position indication sensor 408 are very unlikely to be affected by the valve mechanism slipping a gear. Therefore, the use of the position indicator allows the system to harness the torque-limiting capabilities, while avoiding drawbacks of the lack of correlation between position of the external magnetic array and the position of the valve stem.

The position indication sensor 408 is useful because the sensor provides the position of the valve, which is needed particularly when the valve slips or skips. Because the present invention uses attracting and opposing magnets, the valve is automatically repositioned to one or more predetermined positions if the valve skips or slips. For example, if the valve is over torqued and the magnetic arrays skip and realign, it is important to know the exact position for the valve. Because the present invention automatically realigns to one or more predetermined positions, the position indicator provides for the precise position of the valve.

Figure 8:
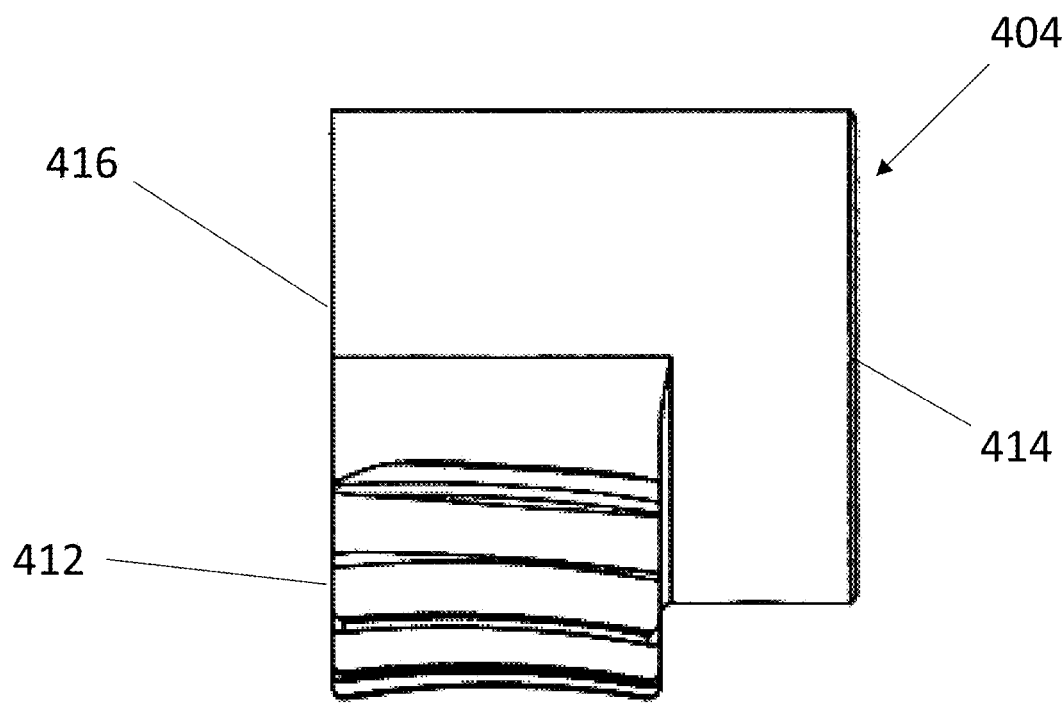
FIG. 8 illustrates a side orthogonal view of a gear component of a magnetically actuated quarter-turn pipe valve including a magnetic strip for position indication according to one embodiment of the present invention.

FIG. 7 and FIG. 8 illustrate a gear component of a magnetically actuated quarter-turn pipe valve including a magnetic strip for position indication according to one embodiment of the present invention. In one embodiment, a gear 404 is a substantially cylindrical component compatible with a position indicator sensor includes a front end 416 and a back end 414. The gear 404 defines a central bore 418 configured to tightly fit and rotationally couple a central shaft, such that rotation of the gear 404 causes rotation of the central shaft. Gear teeth 412 extend radially outwardly from a side surface of the gear 404 such that the gear teeth 412 are able to intermesh with another gear to allow for rotation of the central shaft. In one embodiment, the gear teeth 412 extend from approximately half the circumference of the gear 404, approximately 66% of the circumference of the gear 404, approximately 75% of the circumference of the gear 404, or from any percentage of the circumference of the gear 404. Through a section of the circumference of the gear 404 from which the gear teeth 412 do not extend, at least one magnetic strip 410 extends outwardly from the side surface of the gear 404. In one embodiment, a first end of the magnetic strip 410 is positioned closer to the front end 416 of the gear than a second end of the magnetic strip 410. Therefore, the magnetic strip 410 has a slope such that the height of the magnetic strip 410 varies across a portion of the circumference of the gear 404.

The varying height of the magnetic strip 410 is important, as it allows a position indication sensor to detect different magnetic field strength as the gear 404 rotates. For example, in one embodiment, the position indication sensor is positioned at a height $z_0$ relative to the gear 404 and a portion of the magnetic strip 410 is located directly adjacent (i.e., at height $z_0$) to the position indication sensor when the valve is in a fully open position. However, as the gear rotates 404 and the valve opens, the position indication sensor remains at substantially the same position, while the portion of the magnetic strip 410 closest to the position indication sensor is now located at height $z_1$, meaning the magnetic field strength detected by the position indication sensor will necessarily be decreased. Therefore, the radial position of the gear 404 (and thus also the position of the valve) is able to be determined based on the magnetic field strength detected by the position indication sensor.

Figure 9:
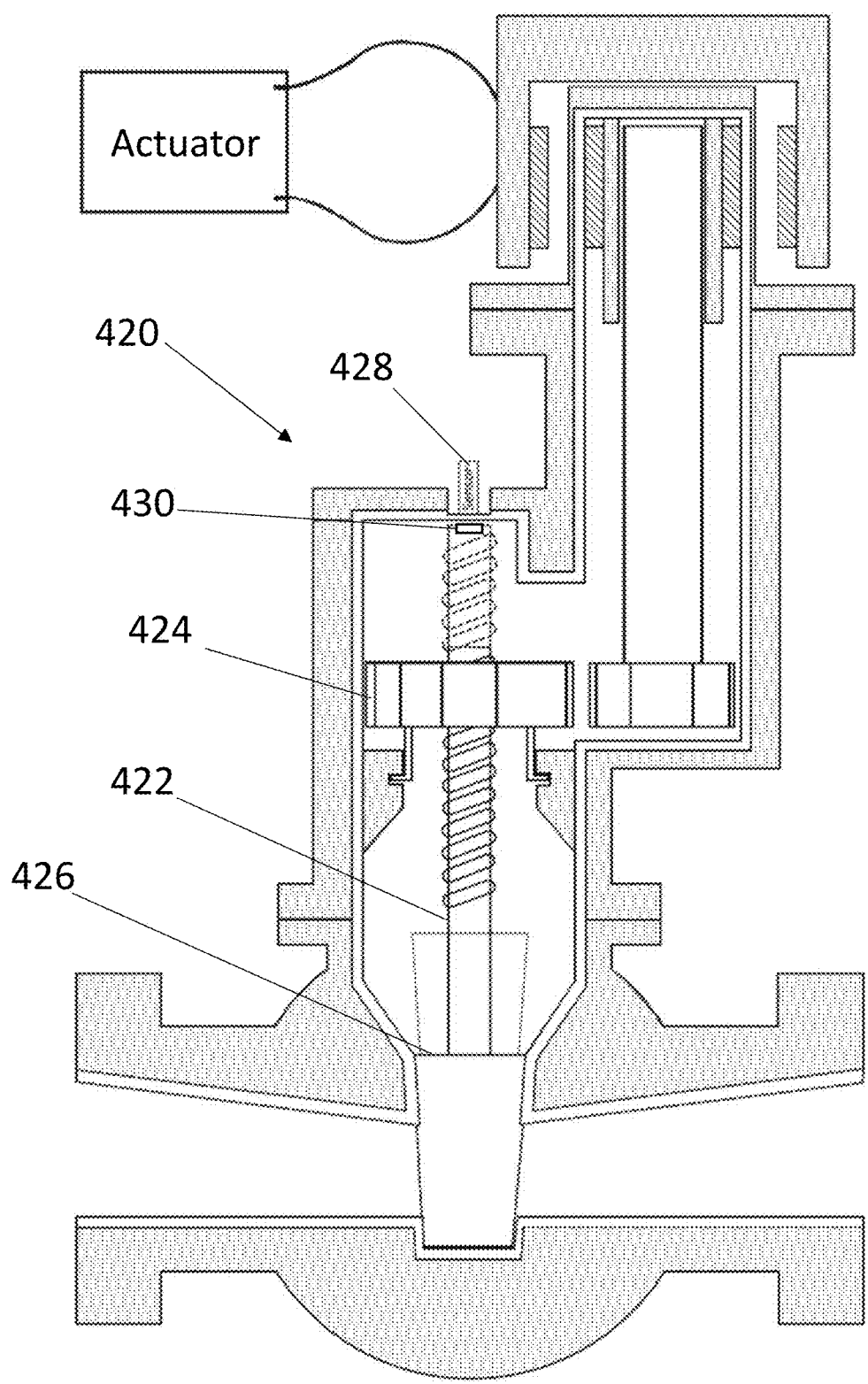
FIG. 9 illustrates a side sectional view of a magnetically actuated rising stem pipe valve including a position indication sensor according to one embodiment of the present invention.

FIG. 9 illustrates a side sectional view of a magnetically actuated rising stem pipe valve including a position indication sensor according to one embodiment of the present invention. Because the rising stem valve has a different mechanical actuation mechanism (i.e., a plug rising and falling, rather than a shaft merely rotating), it is often beneficial to utilize a different position indication system than in a quarter-turn valve. In this embodiment, the valve housing 420 includes a valve stem 422 connected at a first end to a stopper 426 able to open or close a valve, partially or fully. The valve stem 422 is rotated by a gear mechanism 424, wherein the gear mechanism causes the valve stem 422 (and therefore also the stopper 426) to rise and fall. In one embodiment, a magnetic component 430 is positioned on a second end of the valve stem 422, wherein the second end is opposite the first end of the valve stem 422. When the valve is in a fully open position, the valve stem 422 is at a fully raised position, close to an interior wall of the valve housing 420. In one embodiment, a position indication sensor 428 (e.g., a hall effect sensor) is positioned external to the valve housing 420 at a thin-walled region of the valve housing 420 proximate to the valve stem 422 when the valve is in a fully open position. Therefore, as the valve is opened, the valve stem 422 moves closer to the position indication sensor 428, increasing the magnetic field strength detected by the position indication sensor 428. Similarly, as the valve is closing, the valve stem 422 moves further away from the position indication sensor 428, decreasing the detected magnetic field strength. Therefore, even if the external magnetic array in the first order magnetic coupling slips, this slippage does not affect whether the position indication sensor 428 is able to detect the position of the valve stem 422.

In one embodiment, the data from the position indication sensor is transmitted, via one or more cables or wirelessly, to at least one processor. The at least one processor is able to convert the magnetic field strength data generated by the position indication sensor to position data for the valve. In one embodiment, the at least one processor is operable to communicate with the at least one actuator driving the at least one external magnetic gear of the magnetic gearing system. In one embodiment, the processor communicates the position data for the valve to the at least one actuator in real time. By communicating with the at least one motor in real time, the at least one actuator is operable to perform an adjustment rotation of the at least one external magnetic gear to achieve an expected valve position. In one embodiment, the at least one actuator (or at least one processor connected to the actuator) compares the actual position of the valve based on the position data from the at least one position indication sensor to the most recently commanded valve position and generates the adjustment rotation based on the discrepancy between the actual position and the commanded position. In one embodiment, the at least one actuator includes at least one electric motor, at least one hydraulic actuator, and/or at least one pneumatic actuator.

In one embodiment, the valve housing includes at least one mechanical indicator and/or at least one transparent or translucent window, such that an external operator is able to view internal components of the valve mechanism, and therefore able to view the valve position. In one embodiment, the at least one mechanical indicator includes at least one display window showing a quantity of oil, magnetic metal shavings, or other indicators, whose positions, or levels, within the display window are modified by the movement of the valve mechanism. In another embodiment, the at least one transparent or translucent window is replaced or supplemented by at least one manual readout and/or at least one digital readout operable to display a position of the valve stem and/or a position of the valve (e.g., 30% closed) based on data received by the at least one position indication sensor. This is helpful especially if an operator needs to manually turn the external magnetic array to adjust the valve position.

One of ordinary skill in the art will understand that the present invention is operable to include the usage of inner and/or outer magnetic arrays as described above (including both Halbach array and alternating magnet embodiments) with respect to rising stem valves, quarter turn valves, and/or other types of valves, including, but not limited to, those described in U.S. Pat. Nos. 7,971,855 and 8,132,786, each of which is incorporated herein by reference in its entirety.

Figure 10:
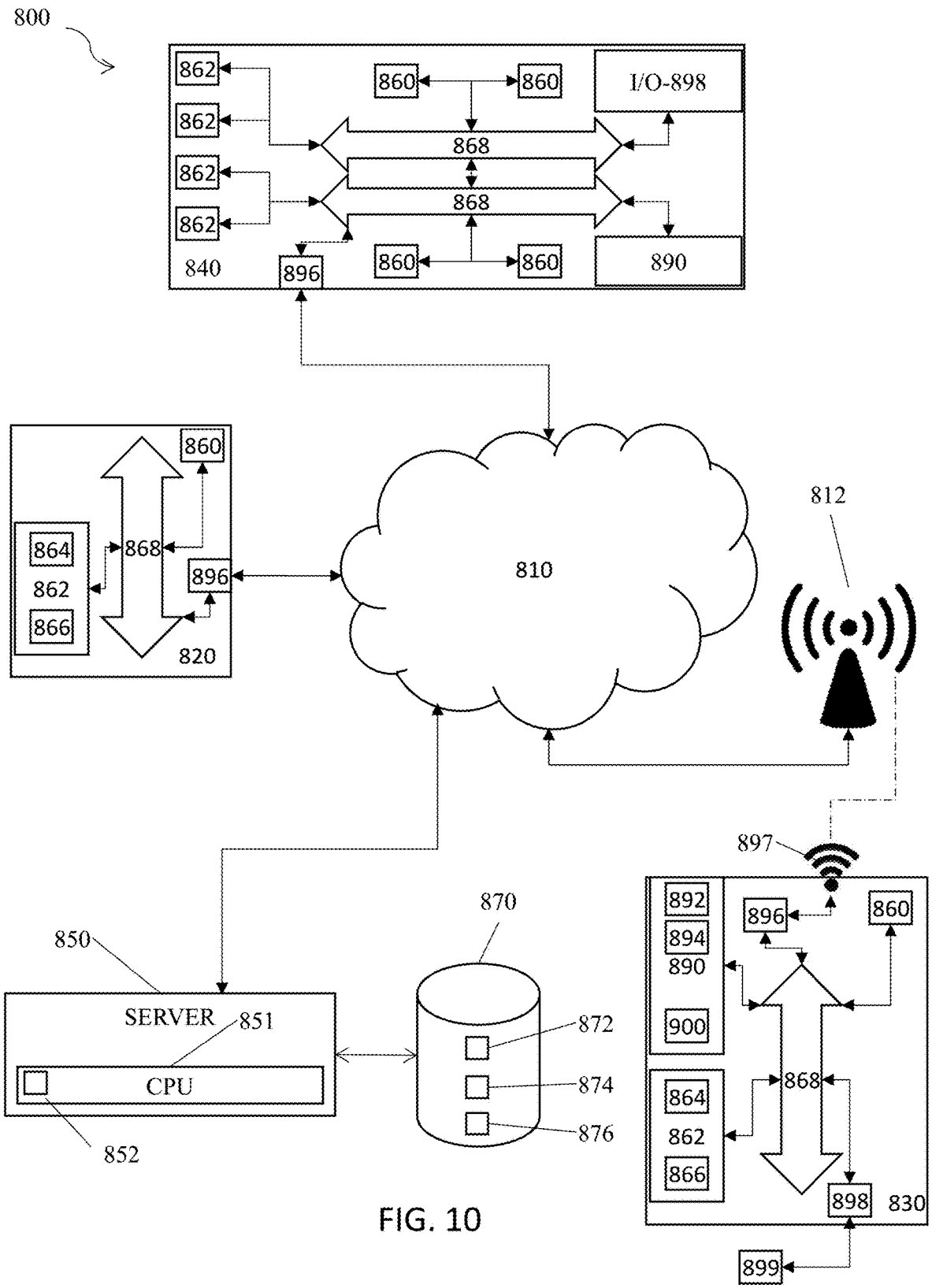
FIG. 10 is a schematic diagram of a system of the present invention.

FIG. 10 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFD), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 10, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 10, is operable to include other components that are not explicitly shown in FIG. 10, or is operable to utilize an architecture completely different than that shown in FIG. 10. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A magnetically actuated valve with a magnetic clutch, comprising:
   an actuator stem, rotation of which is configured to actuate the valve, causing the valve to move between an open position, a closed position, and one or more semi-open positions;
   a magnetic clutch, wherein the magnetic clutch includes an outer magnetic array, wherein the outer magnetic array includes a plurality of constituent magnets or a plurality of distinct magnetic domains, surrounding a segment of the actuator stem;
   a valve housing, defining a pressure vessel of the valve, encapsulating the actuator stem, wherein the outer magnetic array surrounds a section of the valve housing; and
   a position indicator attached to an outside surface of the valve housing configured to detect a configuration of the valve;
   wherein the plurality of constituent magnets or the plurality of distinct magnetic domains in the outer magnetic array are organized as a Halbach array;
   wherein the magnetic clutch is configured to slip without breaking the actuator stem;
   wherein the magnetic clutch is configured to automatically reset and realign after slipping due to tight spacing of the plurality of constituent magnets or the plurality of distinct magnetic domains;
   wherein actuation of the outer magnetic array applies torque, thereby actuating the actuator stem.

2. The magnetically actuated valve with a magnetic clutch of claim 1, wherein the valve housing includes at least one transparent or translucent window providing for visualization of the configuration of the valve.

3. The magnetically actuated valve with a magnetic clutch of claim 1, further comprising at least one digital display connected to the valve housing configured to receive data from the position indicator and to display the configuration of the valve.

4. The magnetically actuated valve with a magnetic clutch of claim 1, wherein the valve is a quarter turn valve or a rising stem valve.

5. The magnetically actuated valve with a magnetic clutch of claim 1, wherein the valve includes an inner magnetic array and/or a plurality of ferromagnetic metal elements on which torque is able to be applied by the outer magnetic array.

6. The magnetically actuated valve with a magnetic clutch of claim 1, wherein the position indicator includes at least one magnetic sensor.

7. The magnetically actuated valve with a magnetic clutch of claim 1, wherein a plurality of radially spaced apart ferrous elements are embedded in a wall of the valve housing proximate to the outer magnetic array.

8. The magnetically actuated valve with a magnetic clutch of claim 1, wherein the outer magnetic array is connected to at least one actuator, and wherein the at least one actuator receives commands wirelessly via a remote user device.

\* \* \* \* \*